US012723748B1

(12) United States Patent
Li et al.

(10) Patent No.: US 12,723,748 B1
(45) Date of Patent: Sep. 1, 2026

(54) LED WATERPROOF LIGHT STRING

(71) Applicant: Xiamen Longstar Lighting Co., Ltd., Xiamen (CN)

(72) Inventors: Xilong Li, Xiamen (CN); Xinling Huang, Xiamen (CN); Jinbo Liu, Xiamen (CN); Zhihui Lai, Xiamen (CN)

(73) Assignee: Xiamen Longstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 19/375,931

(22) Filed: Oct. 31, 2025

(30) Foreign Application Priority Data

Jun. 9, 2025 (CN) ......................... 202521169827.5

(51) Int. Cl.

| | |
|---|---|
| ***F21V 31/00*** | (2006.01) |
| ***F21S 4/10*** | (2016.01) |
| ***F21V 17/12*** | (2006.01) |
| ***F21V 23/00*** | (2015.01) |
| ***F21V 23/06*** | (2006.01) |
| *F21Y 115/10* | (2016.01) |

(52) U.S. Cl.
CPC .............. *F21V 31/005* (2013.01); *F21S 4/10* (2016.01); *F21V 17/12* (2013.01); *F21V 23/002* (2013.01); *F21V 23/06* (2013.01); *F21Y 2115/10* (2016.08)

(58) Field of Classification Search
CPC ...... F21V 31/005; F21V 17/12; F21V 23/002; F21V 23/06; F21V 31/00; F21V 3/00; F21S 4/10; F21Y 2115/10; F21W 2131/401
See application file for complete search history.

(56) References Cited

U.S. PATENT DOCUMENTS 12,359,801 B1 * 7/2025 Ruan ........................ F21V 23/06
2004/0165384 A1 * 8/2004 Allen ........................ F21S 4/10 362/267
2023/0034293 A1 * 2/2023 Wang .................... F21V 23/001
2025/0020316 A1 * 1/2025 Lei ........................ F21V 31/005
2025/0035273 A1 * 1/2025 Zhang ..................... F21V 17/06
2025/0129903 A1 * 4/2025 Xu ............................ F21S 4/10

* cited by examiner

*Primary Examiner* — Bao Q Truong
(74) *Attorney, Agent, or Firm* — Cooper Legal Group, LLC

(57) ABSTRACT

An LED waterproof light string includes a plurality of light-emitting subunits connected in series. Each of the plurality of light-emitting subunits includes a housing, an input wire assembly, an output wire assembly, and two light source boards. The input wire assembly and the housing are integrally formed by an injection molding process. A sealing ring is disposed between the output wire assembly and a bottom of a groove, and the output wire assembly includes one or more mounting holes. The two light source boards are respectively fixedly connected to the input wire assembly and the output wire assembly, and an output end pad of a first one of the two light source boards connected to the input wire assembly is connected to an input end pad of a second one of the two light source boards connected to the output wire assembly through an intermediate power wire.

6 Claims, 2 Drawing Sheets

LED WATERPROOF LIGHT STRING

RELATED APPLICATIONS

This application claims priority to Chinese patent application number 202521169827.5, filed on Jun. 9, 2025. Chinese patent application number 202521169827.5 is incorporated herein by reference.

FIELD OF THE DISCLOSURE

The present disclosure relates to lighting device and in particular to a light emitting diode (LED) waterproof light string.

BACKGROUND OF THE DISCLOSURE

Light emitting diode (LED) light strings are widely used in areas such as decorative lighting, landscape illumination, and outdoor advertising due to their advantages like energy efficiency, long lifespan, and rich colors. Traditional LED light strings are typically composed of LED beads, wires, insulating shells, and waterproof structures, and require complex assembly processes for connection. With the popularization of outdoor LED lighting, the market demand for easy-to-install, highly waterproof, and repairable light strings is increasingly growing.

The current assembly process for LED light strings is complex and faces the following issues:

① Low assembly efficiency: low production efficiency and high labor costs;

② Difficulty in repair: integrated packaging design requires overall replacement after damage, increasing maintenance costs; and ③ Poor waterproof reliability: reliance on potting for waterproofing, which is prone to aging and water seepage over long-term use, leading to short circuits of circuitry.

BRIEF SUMMARY OF THE DISCLOSURE

The technical problem to be solved by the present disclosure is to provide an LED waterproof light string, which can be quickly assembled and has excellent waterproof performance.

In order to solve the above technical problems, the present disclosure provides an LED waterproof light string comprising a plurality of light-emitting subunits connected in series.

Each of the plurality of light-emitting subunits comprises a housing, an input wire assembly, an output wire assembly, and two light source boards.

The input wire assembly and the housing are integrally formed by an injection molding process, and a side of the housing away from the input wire assembly comprises a groove on which the output wire assembly is mounted. A sealing ring is disposed between the output wire assembly and a bottom of the groove, and the output wire assembly comprises one or more mounting holes for one or more bolts to pass through. After the one or more bolts pass through the one or more mounting holes, the output wire assembly and the sealing ring are in an interference fit.

The two light source boards are respectively fixedly connected to the input wire assembly and the output wire assembly, and an output end pad of a first one of the two light source boards connected to the input wire assembly is connected to an input end pad of a second one of the two light source boards connected to the output wire assembly through an intermediate power wire.

In a preferred embodiment, a side of the input wire assembly and a side of the output wire assembly facing each other each comprises a protruding platform, and each of the two light source boards comprises a through hole configured to be matched with the protruding platform for connection.

In a preferred embodiment, the output wire assembly and the input wire assembly of two adjacent light-emitting subunits of the plurality of light-emitting subunits are connected in series via a transmission wire.

The present disclosure further provides a LED waterproof light string comprising a plurality of light-emitting subunits connected in series.

Each of the plurality of light-emitting subunits comprises a housing, an input wire assembly, an output wire assembly, and two light source boards.

The output wire assembly and the housing are integrally formed by an injection molding process, and a side of the housing away from the output wire assembly comprises a groove on which the input wire assembly is mounted. A sealing ring is disposed between the input wire assembly and a bottom of the groove, and the input wire assembly comprises one or more mounting holes for one or more bolts to pass through. After the one or more bolts pass through the one or more mounting holes, the input wire assembly and the sealing ring are in an interference fit.

The two light source boards are respectively fixedly connected to the input wire assembly and the output wire assembly, and an output end pad of a first one of the two light source boards connected to the input wire assembly is connected to an input end pad of a second one of the two light source boards connected to the output wire assembly through an intermediate power wire.

In a preferred embodiment, a side of the input wire assembly and a side of the output wire assembly facing each other each comprises a protruding platform, and each of the two light source boards comprises a through hole configured to be matched with the protruding platform for connection.

In a preferred embodiment, the output wire assembly and the input wire assembly of two adjacent light-emitting subunits of the plurality of light-emitting subunits are connected in series via a transmission wire.

Compared with the existing techniques, the technical solution has the following advantages.

The present disclosure provides an LED light string structure that is easy to assemble quickly and has excellent waterproof performance. It is suitable for lighting scenes that require waterproofing and dustproofing, such as outdoor decoration, landscape lighting, and advertising signs.

DETAILED DESCRIPTION OF THE EMBODIMENTS

In order to make the technical solutions and features of the present disclosure clearer, the present disclosure is further described in detail below with reference to the accompanying drawings and specific examples. It should be understood that these examples are only used to illustrate the present disclosure and are not used to limit the scope of the present disclosure. After reading the present disclosure, modifications of various equivalent forms of the present disclosure made by those skilled in the art all fall within the scope defined by the claims attached to this application.

Figure 1:
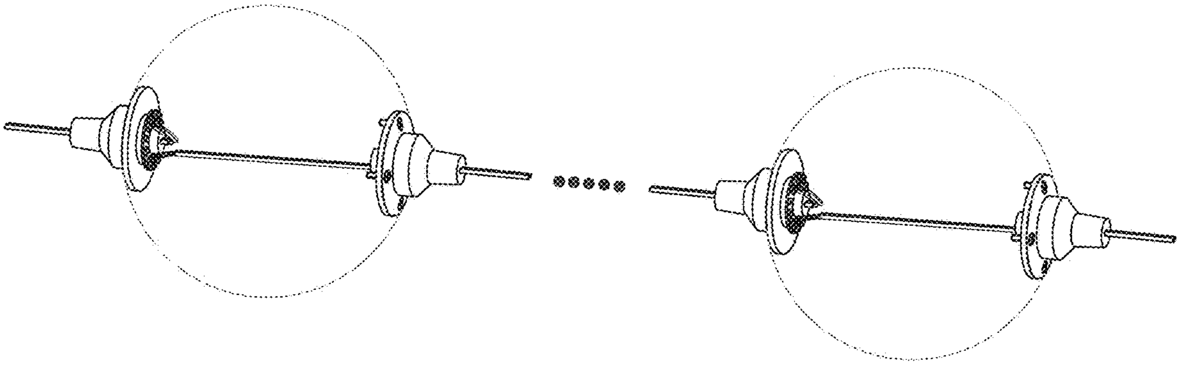
FIG. 1 is a perspective view of a light emitting diode (LED) light string in a preferred embodiment of the present disclosure.
Figure 2:
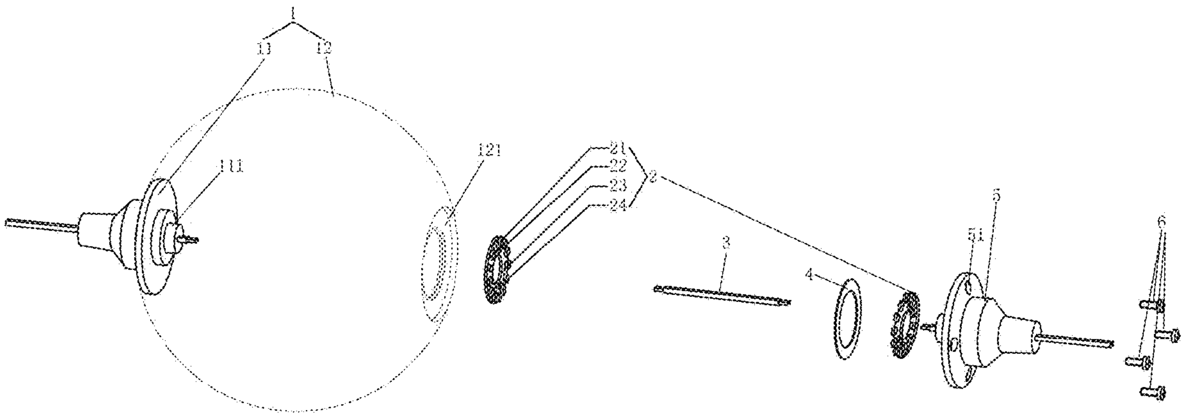
FIG. 2 is an exploded view of a light-emitting subunit in the preferred embodiment of the present disclosure.

Referring to FIGS. 1 and 2, this embodiment provides a light emitting diode (LED) waterproof light string, and the LED waterproof light string comprises a plurality of light-emitting subunits connected in series.

Each of the plurality of light-emitting subunits comprises a housing 12, an input wire assembly 11, an output wire assembly 5, and two light source boards 2. The input wire assembly 11 and the housing 12 are integrally formed into an integrated structure by an injection molding process, and a side of the housing 12 away from the input wire assembly 11 comprises a groove 121 on which the output wire assembly 5 is mounted. A sealing ring 4 is disposed between the output wire assembly 5 and a bottom of the groove 121, and the output wire assembly 5 comprises one or more mounting holes 51 for one or more bolts 6 to pass through. After the one or more bolts 6 pass through the one or more mounting holes 51, the output wire assembly 5 and the sealing ring 4 are in an interference fit.

The two light source boards 2 are respectively fixedly connected to the input wire assembly 11 and the output wire assembly 5, and an output end pad 24 of a first one of the two light source boards 2 connected to the input wire assembly 11 is connected to an input end pad 22 of a second one of the two light source boards 2 connected to the output wire assembly 5 through an intermediate power wire 3.

The LED waterproof light string, in which the input wire assembly 11 and the housing 12 are injection-molded as the integrated structure, has a good waterproof and dustproof effect, and the output wire assembly 5 also has a good waterproof and dustproof effect after being connected to the housing 12 through the sealing ring 4. Therefore, an LED light string structure that is easy to assemble quickly and has excellent waterproof performance is achieved, which is suitable for outdoor decoration, landscape lighting, advertising signs, and other lighting scenes that require waterproofing and dustproofing. For enterprises, parts can be replaced individually when damaged, reducing electronic waste and lowering an overall scrap rate, which is in line with the concept of green manufacturing. For consumers, maintenance costs is low. The LED light string structure not only provides sufficient lighting, but also adds decoration to the entire space.

In this embodiment, in order to install the two light source boards 2, a side of the input wire assembly 11 and a side of the output wire assembly 5 facing each other each comprises a protruding platform 111, and each of the two light source boards 2 comprises a through hole 23 configured to be matched with the protruding platform 111 for connection. Each of the two light source boards 2 comprises a plurality of lamp beads 21 disposed on an outer side of the through holes 23 along a circumferential direction of the through holes 23.

Furthermore, the output wire assembly 5 and the input wire assembly 11 of two adjacent light-emitting subunits of the plurality of light-emitting subunits are connected in series via a transmission wire.

In the above solution, the input wire assembly 11 is integrally formed with the housing 12, and the output wire assembly 5 is connected to the housing 12 via the sealing ring 4. Alternatively, the output wire assembly 5 is integrally formed with the housing 12, and the input wire assembly 11 is connected to the housing 12 via the sealing ring 4.

The above is only a specific implementation of the present disclosure, but the design concept of the present disclosure is not limited to this. Any non-substantial changes to the present disclosure using this concept shall be deemed as an infringement of the protection scope of the present disclosure.

What is claimed is:

1. A light emitting diode (LED) waterproof light string, comprising:

a plurality of light-emitting subunits connected in series, wherein:

each of the plurality of light-emitting subunits comprises a housing, an input wire assembly, an output wire assembly, and two light source boards, the input wire assembly and the housing are integrally formed by an injection molding process, a side of the housing away from the input wire assembly comprises a groove on which the output wire assembly is mounted, a sealing ring is disposed between the output wire assembly and a bottom of the groove, the output wire assembly comprises one or more mounting holes for one or more bolts to pass through, after the one or more bolts pass through the one or more mounting holes, the output wire assembly and the sealing ring are in an interference fit, the two light source boards are respectively fixedly connected to the input wire assembly and the output wire assembly, and an output end pad of a first one of the two light source boards connected to the input wire assembly is connected to an input end pad of a second one of the two light source boards connected to the output wire assembly through an intermediate power wire.

2. The LED waterproof light string according to claim 1, wherein:

a side of the input wire assembly and a side of the output wire assembly facing each other each comprises a protruding platform, and each of the two light source boards comprises a through hole configured to be matched with the protruding platform for connection.

3. The LED waterproof light string according to claim 1, wherein:

the output wire assembly and the input wire assembly of two adjacent light-emitting subunits of the plurality of light-emitting subunits are connected in series via a transmission wire.

4. A light emitting diode (LED) waterproof light string, comprising:

a plurality of light-emitting subunits connected in series, wherein:

each of the plurality of light-emitting subunits comprises a housing, an input wire assembly, an output wire assembly, and two light source boards, the output wire assembly and the housing are integrally formed by an injection molding process, a side of the housing away from the output wire assembly comprises a groove on which the input wire assembly is mounted, a sealing ring is disposed between the input wire assembly and a bottom of the groove, the input wire assembly comprises one or more mounting holes for one or more bolts to pass through, after the one or more bolts pass through the one or more mounting holes, the input wire assembly and the sealing ring are in an interference fit, the two light source boards are respectively fixedly connected to the input wire assembly and the output wire assembly, and an output end pad of a first one of the two light source boards connected to the input wire assembly is connected to an input end pad of a second one of the two light source boards connected to the output wire assembly through an intermediate power wire.

5. The LED waterproof light string according to claim 4, wherein:

a side of the input wire assembly and a side of the output wire assembly facing each other each comprises a protruding platform, and each of the two light source boards comprises a through hole configured to be matched with the protruding platform for connection.

6. The LED waterproof light string according to claim 4, wherein:

the output wire assembly and the input wire assembly of two adjacent light-emitting subunits of the plurality of light-emitting subunits are connected in series via a transmission wire.

* * * * *